(12) United States Patent
Yokoyama et al.

(10) Patent No.: US 9,770,816 B2
(45) Date of Patent: Sep. 26, 2017

(54) ANGLE WRENCH AND ROTATION ANGLE-MEASURING DEVICE

(71) Applicant: TOHNICHI MFG. CO., LTD., Ota-ku, Tokyo (JP)

(72) Inventors: Tetsuya Yokoyama, Tokyo (JP); Shinji Murayama, Tokyo (JP); Nobuyoshi Kobayashi, Tokyo (JP); Yoshiro Kanda, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 326 days.

(21) Appl. No.: 14/419,614

(22) PCT Filed: Jul. 30, 2013

(86) PCT No.: PCT/JP2013/004604
§ 371 (c)(1),
(2) Date: Feb. 4, 2015

(87) PCT Pub. No.: WO2014/027443
PCT Pub. Date: Feb. 20, 2014

(65) Prior Publication Data
US 2015/0190911 A1     Jul. 9, 2015

(30) Foreign Application Priority Data

Aug. 17, 2012   (JP) ................. 2012-181221

(51) Int. Cl.
*B25B 23/142*    (2006.01)
*G01B 5/24*      (2006.01)

(52) U.S. Cl.
CPC ...... *B25B 23/1422* (2013.01); *B25B 23/1425* (2013.01); *B25B 23/1427* (2013.01); *G01B 5/24* (2013.01)

(58) Field of Classification Search
CPC ........... B25B 23/1422; B25B 23/1425; B25B 23/1427
See application file for complete search history.

(56) References Cited

U.S. PATENT DOCUMENTS

| 6,629,055 B2* | 9/2003 | McGee | .................. B25B 23/14 |
| | | | 702/113 |
| 6,698,298 B2* | 3/2004 | Tsuji | .................. B25B 23/1425 |
| | | | 73/862.21 |

(Continued)

FOREIGN PATENT DOCUMENTS

| JP | H08-141927 A | 6/1996 |
| JP | 2001-009749 A | 1/2001 |

(Continued)

OTHER PUBLICATIONS

Europe Patent Office, "Search Report for European Patent Application No. 13879460.7," Feb. 18, 2016.
PCT, "International Search Report for PCT/JP2013/004604".

*Primary Examiner* — David B Thomas
(74) *Attorney, Agent, or Firm* — Manabu Kanesaka

(57) ABSTRACT

An angle wrench has a simple structure and is capable of accurately measuring rotation angle. The angle wrench is used for tightening an object to be tightened by means of the rotation angle method, and includes a handle having a grip; a head section having a tightening head for tightening the object to be tightened, and a tail section that extends from the tightening head pivotally supported with respect to the handle via a head pin; torque-detecting mechanisms for detecting when the torque for tightening the object being tightened reaches the specified torque; and a rotation angle-measuring section for measuring the rotation angle of the angle wrench in a tightening action, on the basis of the angular velocity of the angle wrench around the axis of the (Continued)

object being tightened, after the torque-detecting mechanism has detected that the specified torque has been reached.

5 Claims, 2 Drawing Sheets

(56) References Cited

U.S. PATENT DOCUMENTS

| | | | |
|---|---|---|---|
| 7,082,866 B2 | 8/2006 | Becker | |
| 7,565,844 B2* | 7/2009 | Crass | B25B 23/1425 73/862.21 |
| 7,841,100 B2* | 11/2010 | Lucke | B25B 23/1425 33/1 PT |
| 7,900,524 B2* | 3/2011 | Calloway | B25B 23/14 73/862.22 |
| 7,934,428 B2* | 5/2011 | Schultz | B25B 23/14 73/761 |
| 8,171,828 B2* | 5/2012 | Duvan | B25B 13/462 73/862.21 |
| 8,393,231 B2* | 3/2013 | Chen | B25B 23/14 73/862.21 |
| 8,443,703 B2* | 5/2013 | Chen | B25B 23/1425 73/862.23 |
| 8,555,755 B2* | 10/2013 | Cattaneo | B25B 23/0035 73/761 |
| 8,714,057 B2* | 5/2014 | Anjanappa | B25B 23/1425 81/467 |
| 8,886,492 B2* | 11/2014 | Wener | B25B 23/1425 702/151 |
| 8,918,292 B2* | 12/2014 | Wener | B25B 23/1425 7/138 |
| 9,085,072 B2* | 7/2015 | Anjanappa | B25B 23/1425 |
| 9,156,148 B2* | 10/2015 | King | B25B 23/1425 |
| 9,272,397 B2* | 3/2016 | Goetz | B25F 5/00 |
| 9,320,558 B2* | 4/2016 | Cattaneo | B25B 23/1425 |
| 9,523,618 B2* | 12/2016 | King | G01L 5/24 |
| 2002/0152820 A1* | 10/2002 | Tsuji | B25B 23/1425 73/862.21 |
| 2003/0065456 A1* | 4/2003 | McGee | B25B 23/14 702/41 |
| 2003/0065474 A1* | 4/2003 | McGee | B25B 23/14 702/151 |
| 2005/0092143 A1* | 5/2005 | Lehnert | B25B 23/1425 81/469 |
| 2008/0208522 A1* | 8/2008 | Lucke | B25B 23/1425 702/151 |
| 2009/0078057 A1* | 3/2009 | Schultz | B25B 23/1425 73/862.23 |
| 2010/0058901 A1* | 3/2010 | Calloway | B25B 23/14 81/479 |
| 2010/0199782 A1* | 8/2010 | Hsieh | B25B 23/1425 73/862.23 |
| 2011/0132157 A1* | 6/2011 | Duvan | B25B 13/462 81/479 |
| 2011/0162493 A1* | 7/2011 | Anjanappa | B25B 23/1425 81/479 |
| 2011/0303054 A1* | 12/2011 | Cattaneo | B25B 23/0035 81/479 |
| 2012/0006161 A1* | 1/2012 | Chen | B25B 23/1425 81/479 |
| 2012/0036970 A1* | 2/2012 | Chen | B25B 17/02 81/479 |
| 2012/0118078 A1* | 5/2012 | Chen | B25B 23/14 73/862.21 |
| 2012/0119919 A1* | 5/2012 | Chen | B25B 23/14 340/665 |
| 2012/0132043 A1* | 5/2012 | Chen | B25B 23/1425 81/479 |
| 2013/0211413 A1* | 8/2013 | Cattaneo | A61B 17/8875 606/104 |

FOREIGN PATENT DOCUMENTS

| | | |
|---|---|---|
| JP | 2001-009750 A | 1/2001 |
| WO | 2004/035267 A1 | 4/2004 |
| WO | 2012/069936 A1 | 5/2012 |

* cited by examiner

ANGLE WRENCH AND ROTATION ANGLE-MEASURING DEVICE

RELATED APPLICATIONS

The present application is National Phase of International Application No. PCT/JP2013/004604 filed Jul. 30, 2014, and claims priority from Japanese Application No. 2012-181221, filed Aug. 17, 2012, the disclosure of which is hereby incorporated by reference herein in its entirety.

TECHNICAL FIELD

The present invention relates to an angle wrench for tightening a fastening member by a rotation angle method (angle tightening).

BACKGROUND ART

Conventionally, fastening methods for screwing a body to be fastened such as an apparatus by predetermined fastening force using fastening screws such as bolts may include, for example, a torque fastening method using a torque wrench and a (plastic) a rotation angle method in which the amount of tightening is specified by the angle of tightening.

For tightening a screw by the plastic rotation angle method, the screw is first tightened at a specified torque value (snug torque or torque at the yield point) as tightening in the elastic region of the screw. After that, the wrench is subsequently turned by a predetermined angle as tightening in the plastic region of the screw in order to further tighten the screw.

Tightening tools to be used for tightening screws by the rotation angle method may include an angle wrench (see Patent Literature 1). The angle wrench in Patent Literature 1 has an angular velocity sensor secured to a head member and is configured to detect the operation of a toggle by detecting the displacement of the angular velocity sensor. Then, the rotation angle from the toggle actuation onward is determined from the angular velocity that is measured by the angular velocity sensor.

CITATION LIST

Patent Literature

[Patent Literature 1] Japanese Patent Application Laid-Open No. 2001-9749

SUMMARY OF INVENTION

Technical Problem

For the angle wrench disclosed in Patent Literature 1, the angular velocity sensor has to be secured to a head member, for example, with a screw. Thus, for example, a separate case for securing the angular velocity sensor is required, and the angular velocity sensor needs to be wrapped with a cushioning material in order to absorb an impact when the angular velocity sensor is displaced integrally with the head member. These needs complicate and impose limitations on the structure.

In this context, it is an object of the invention of the subject application to provide an angle wrench which is simplified in structure and capable of measuring rotation angles with accuracy.

Solution to Problem

To address the aforementioned problems, the present invention provides an angle wrench used for tightening an object to be tightened by a rotation angle method. The angle wrench is characterized by including: a handle having a grip; a head section having a tightening head for tightening the object to be tightened and a tail section that extends from the tightening head being pivotally supported with respect to the handle via a headpin; a torque-detectingmechanism for detecting when a torque for tightening the object to be tightened has reached a specified torque; and a rotation angle-measuring section for measuring a rotation angle of the angle wrench in a tightening action, on the basis of an angular velocity of the angle wrench around an axis of the object being tightened, after a timing the torque-detecting mechanism detects that the specified torque has been reached.

Advantageous Effects of Invention

According to the present invention, it is possible to provide an angle wrench which is simplified in structure and capable of measuring the rotation angle with accuracy.

DESCRIPTION OF EMBODIMENTS

Now, a description will be made to an embodiment of the present invention with reference to the drawings.

Figure 1:
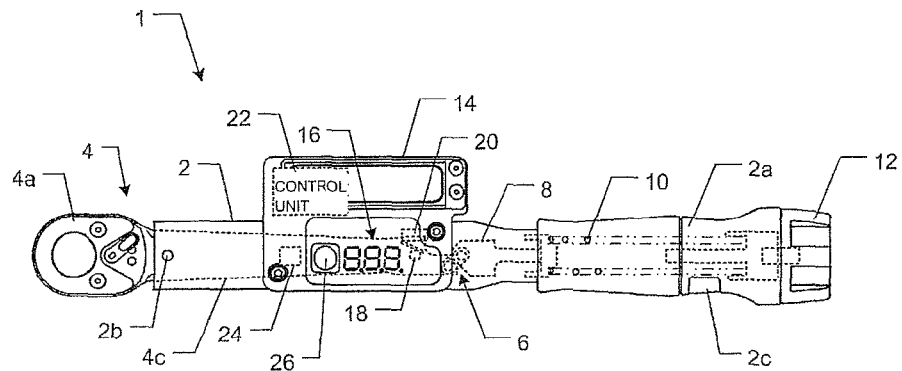
FIG. 1 is a view illustrating the outer appearance of an angle wrench of an embodiment.
Figure 2:
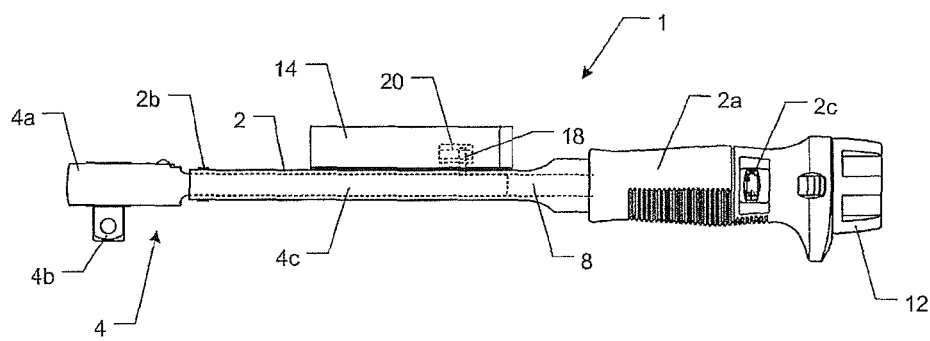
FIG. 2 is a view illustrating the outer appearance of the angle wrench when viewed from side.
Figure 3:
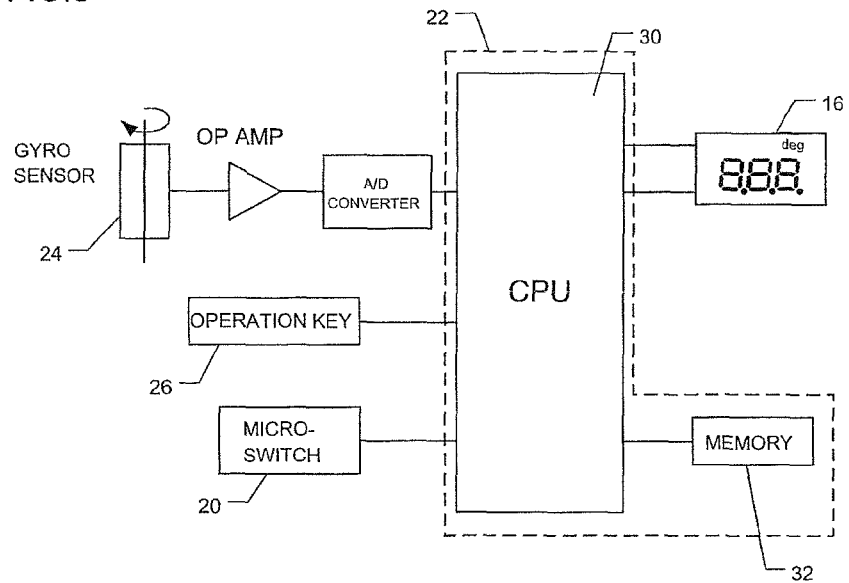
FIG. 3 is a block diagram illustrating an electrical circuit configuration of a device for measuring the rotation angle of the angle wrench.

FIG. 1 is a view illustrating the outer appearance of an angle wrench 1 of this embodiment. FIG. 2 is a view illustrating the outer appearance of the angle wrench 1 when viewed from side. FIG. 3 is a schematic block diagram illustrating the electrical circuit configuration of the angle wrench 1. Note that FIGS. 1 and 2 illustrate the internal configuration by broken lines.

The angle wrench 1 is a tool which fastens, by the (plastic) rotation angle method, screws such as bolts serving as an object to be tightened (fastening member) for securing a body to be fastened such as various materials or devices. The angle wrench 1 functions to tighten a screw first with a specified torque (typically, the snug torque in the rotation angle method) in order to tighten the screw by the rotation angle method and functions to perform the angle tightening by a predetermined rotation angle subsequently after the tightening with the specified torque. Now, a description will be made to each component of the angle wrench 1.

The angle wrench 1 includes a handle 2, a head section 4, a toggle mechanism 6, a thruster 8, a spring 10, a torque adjustment knob 12, a case 14, a display unit 16, an interlock pin 18 serving as an interlock member, a microswitch 20 serving as a detection sensor, a control unit 22, a gyro sensor 24, and an operation key 26. The toggle mechanism 6, the interlock pin 18, and the microswitch 20 implement a torque-detecting mechanism.

The handle 2, which is a tube-shaped member, retains therein a tail section 4c of the head section 4 inserted through the opening on the top side and is provided on the tail side with a grip section 2a that the user grips. The handle 2 is cylindrical in the shape of the portion on which the grip section 2a is provided and flat like a distorted cylindrical tube therefrom toward the top side (toward the head section 4). The handle 2 retains the tail section 4c of the head section 4 inside the handle 2 with a head pin 2b and the toggle mechanism 6. Furthermore, the case 14 is secured to the flat portion of the handle 2.

The head section 4 transfers the force, which is applied on a grip section 2 that the user grips, to a screw to be tightened so as to tighten the screw. The head section 4 is formed of, for example, a tightening head 4a, a square drive 4b, and the tail section 4c. The square drive 4b is attached to the tightening head 4a via a ratchet mechanism in the tightening head 4a. The ratchet mechanism is a well-known mechanism for performing quick tightening by enabling tightening only in one direction, i. e., either in a clockwise or counterclockwise direction. The square drive 4b is provided with a socket that is fitted over a bolt. The square drive 4b is configured to receive sockets of various sizes and shapes. The tail section 4c is an axial member that extends from the tightening head 4a into the handle 2 and pivotally supported by the head pin 2b. The tip of the tail section 4c is coupled to the thruster 8 so as to constitute part of the toggle mechanism 6.

The toggle mechanism 6 is a mechanical component which is actuated when the screw is tightened to a specified torque and informs by means of a click sound or the like that the tightening torque has reached the specified torque. The toggle mechanism 6 of this embodiment is particularly configured such that the rotational movement of the tail section 4c around the head pin 2b that is effected by the actuation of the toggle mechanism 6 functions as a trigger for causing the control unit 22 to start to measure the rotation angle of the torque wrench 1. The toggle mechanism 6 is composed of, for example, the end portion of the tail section 4c that is a first actuation body, the thruster 8, and a link for coupling between the tail section 4c and the thruster 8.

The thruster 8 is a spring receiver member for receiving the force of the spring 10. The thruster 8 retains the tail section 4c via a link by the force of the spring 10 and restricts the rotation of the tail section 4c with respect to the handle 2 until the tightening torque provided by the angle wrench 1 reaches a specified torque. The torque adjustment knob 12 is used to control the amount of deformation of the spring 10, which thereby changes the force for pushing the thruster 8. Then, the amount of deformation of the spring 10 varies the torque for actuating the toggle mechanism 6. The set torque value (the torque value at which the toggle mechanism 6 is actuated) adjusted by turning the torque adjustment knob 12 is displayed on a scale 2c.

A description will now be made to the actuation of the toggle mechanism 6. When force is applied from the grip section 2a to thereby start to tighten an object to be tightened, force for rotating the tail section 4c is generated so as to push back the thruster 8 rearward. Then, the toggle mechanism 6 is actuated when the force for the tail section 4c to push back the thruster 8 rearward against the force of the spring 10 has exceeded the force for the thruster 8 to hold the tail section 4c by the force of the spring 10. When the toggle mechanism 6 is actuated, the state of coupling between the tail section 4c and the thruster 8 is changed from the first coupling state shown in FIG. 1 to a second coupling state. In the second coupling state, the tail section 4c is rotated around the head pin 2b while pushing back the thruster 8 toward the grip section 2a. (Note that with respect to the head section 4 fixed to the screw, the handle 2 is pivoted with respect to the head section 4 when the toggle mechanism 6 is actuated. That is, actuating the toggle mechanism 6 causes one of the handle 2 and the head section 4 to be displaced with respect to the other.) The user can recognize that the tightening torque of the screw has reached a predefined set torque value by a click sound or the like that is generated when the toggle mechanism 6 is actuated.

Furthermore, the case 14 accommodates electronic circuit components such as the microswitch 20, the control unit 22, and the gyro sensor 24. Furthermore, the case 14 includes the display unit 16 and the operation key 26 on the outer surface. The display unit 16 displays, for example, the tightening angle of a screw by the rotation angle method. Then, the electronic circuit components accommodated in the case 14, the display unit 16, and the operation key 26 constitute a rotation angle measuring device for measuring the rotation angle.

When the toggle mechanism 6 is actuated, the interlock pin 18 is displaced with respect to the handle 2 by following the motion of the tail section 4c relative to the handle 2 and thereby pushes the microswitch 20. The interlock pin 18 of this embodiment extends from the handle 2 into the case 14 through the respective holes formed in the handle 2 and the bottom of the case 14. The size and shape of the holes formed in the handle 2 and the case 14 are not limited to a particular one so long as the interlock pin 18 is formed to be greater than the range of the relative displacement of the interlock pin 18 that follows the actuation of the toggle mechanism 6. The interlock pin 18 is configured such that the tip thereof is in contact with the microswitch 20 inside the case 14 when the toggle mechanism 6 is not actuated. When the toggle mechanism 6 is actuated, the microswitch 20 is pushed by the interlock pin 18 to detect the actuation of the toggle mechanism 6.

The microswitch 20 is a sensor for detecting the actuation of the toggle mechanism 6 as described above. The microswitch 20 is disposed in the case 14 and is pushed by the interlock pin 18, which is relatively displaced by following the actuation of the toggle mechanism 6, thereby detecting the actuation of the toggle mechanism 6. The microswitch 20 outputs a toggle actuation signal to the control unit 22 when the toggle mechanism is actuated to cause the microswitch 20 to be pushed by the interlock pin 18.

The control unit 22 that constitutes the rotation angle measuring device provides control to the measurement of the tightening angle of the angle wrench 1. The control unit 22 includes, for example, a central processing unit (CPU) 30 serving as a processor and a memory 32. The CPU 30 executes processing programs that are stored in the memory 32, for example, to measure the tightening angle and display the measured angle on the display unit 16. The CPU 30 may be another processor such as the micro processing unit (MPU). The memory 32 stores various processing programs that the CPU 30 executes. For example, a random access memory (RAM) or a read only memory (ROM) may be employed as the memory 32.

The function implemented by the control unit 22 will be described in relation to the description of the measurement of the tightening angle of the angle wrench 1. Note that the torque wrench 1 may also include a specific circuit such as an application specific integrated circuit (ASIC) as the control unit 22, or alternatively, part or all of the functions of the control unit 22 may also be implemented by a specific circuit such as the ASIC.

To compute the tightening angle of a tightening action by the rotation angle method, the gyro sensor 24 detects the angular velocity of the angle wrench 1 when a screw is tightened. The control unit 22 can determine the angle, by which the angle wrench 1 is rotated, from the angular velocity measured by the gyro sensor 24. For example, it is possible to use a vibration gyro as the gyro sensor 24.

The operation key 26 is a button for providing various types of operation to the angle wrench 1. For example, the operation key 26 may be used to switch the power between ON and OFF or to reset the measured tightening angle. Note that although the figure shows one operation key 26, another operation key may also be included, for example, on the side of the case 14.

Figure 4:
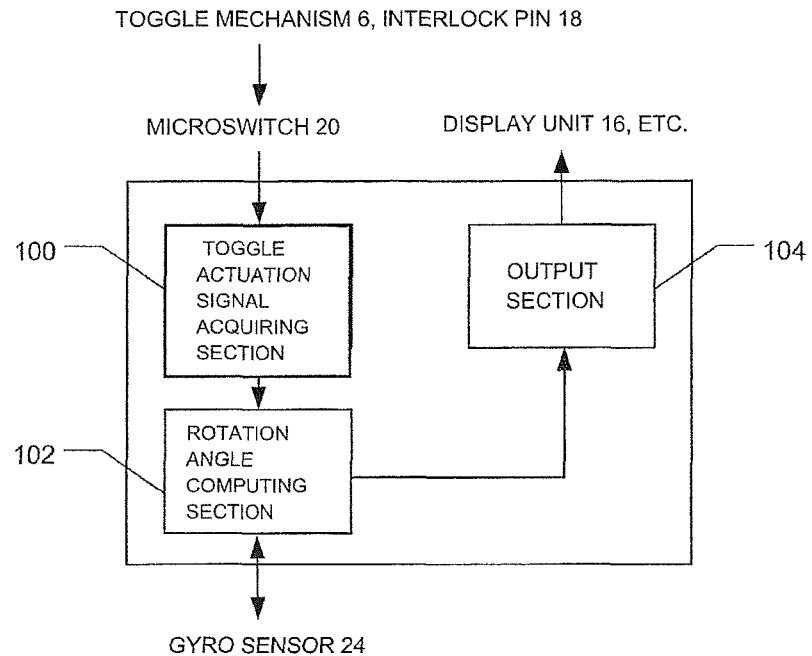
FIG. 4 is a functional block diagram illustrating the function of the device for measuring the rotation angle of the angle wrench.

A description will now be made to the measurement of the tightening angle of the angle wrench 1 according to this embodiment. FIG. 4 is a functional block diagram illustrating the function of the rotation angle measuring device of the angle wrench 1. The angle wrench 1 includes a toggle actuation signal acquiring section 100, a rotation angle computing section 102 serving as a computing section, and an output section 104. Note that the aforementioned gyro sensor 24 and the rotation angle computing section 102 implement the rotation angle-measuring section. These functions of the angle wrench 1 are implemented by the CPU 30 executing the programs stored in the memory 32. Part or all of the functions may also be implemented by an ASIC.

The toggle actuation signal acquiring section 100 acquires a toggle actuation signal from the microswitch 20 that detects the actuation of the toggle mechanism 6. The toggle actuation signal is outputted by the microswitch 20 when the torque provided by the tightening of a screw by the angle wrench 1 has reached a predetermined value to thereby actuate the toggle mechanism 6 and then the interlock pin 18 that is accordingly displaced relative thereto pushes the microswitch 20.

The rotation angle computing section 102 computes the angle, by which the angle wrench 1 is rotated (i.e., the angle by which the screw is tightened), after the torque at which the screw is tightened by the angle wrench 1 has reached a setting torque, that is, the toggle mechanism 6 has been actuated. More specifically, the rotation angle computing section 102 starts to acquire data on the angular velocity from the gyro sensor 24 when the toggle actuation signal acquiring section 100 has acquired the toggle actuation signal. Then, on the basis of the angular velocity data, the rotation angle computing section 102 computes (integrates) the angle (tightening angle) by which the angle wrench 1 has been rotated after the timing at which the toggle actuation signal is acquired.

The output section 104 outputs, to outside, the rotation angle determined by the rotation angle computing section 102. For example, the output section 104 is capable of outputting the rotation angle computed by the rotation angle computing section 102 to the display unit 16 for display thereon. Furthermore, when the rotation angle for tightening is saved as work data, the output section 104 can also store the rotation angle in a predetermined storage device.

The angle wrench 1 of this embodiment has the functions described above. Note that according to the above description of this embodiment, the rotation angle computing section 102 determines the rotation angle by acquiring data on the angular velocity measured by the gyro sensor 24 after the toggle mechanism 6 is actuated. However, the invention is not limited to this method so long as the rotation angle of the angle wrench 1 can be determined after the actuation of the toggle mechanism 6. For example, it is also acceptable to allow the control unit 22 to control the gyro sensor 24 so that the gyro sensor 24 may start to measure the angular velocity after the actuation of the toggle mechanism 6. Even in this case, it is also possible to determine the rotation angle after the toggle mechanism is actuated.

Furthermore, the rotation angle may only have to be cumulatively measured until the user operates the operation key 26 to provide reset operation. The reset processing may be performed not only on the basis of the operation from the operation key 26 but also automatically by means of a trigger with some operation or processing, for example, when the toggle mechanism 6 is returned from the actuated state (the second coupling state) to the non-actuated state (the first coupling state).

Furthermore, the rotation angle computing section 102 may only have to compute the rotation angle of only the rotation of the angle wrench 1 while the toggle mechanism 6 is actuated (in the second coupling state). Then, when the already measured rotation angle data is not reset but retained (i.e., when the measured angle is retained in the memory 32 or the like and the angle is displayed on the display unit 16), the newly computed angle may only have to be added to the rotation angle being retained. Such processing may prevent the addition of the rotation angle due to the rotational action of the angle wrench 1 other than when the angle tightening is performed while the toggle is actuated (due to the rotational action while the toggle is not actuated). For example, even when the ratchet is used to perform angle tightening several times, the ratchet prevents the rotation angle due to the operation of the angle wrench 1 in the direction opposite to the direction of tightening from being added to the measured value. It is thus possible to accurately measure only the angle by which the screw is actually tightened.

Figure 5:
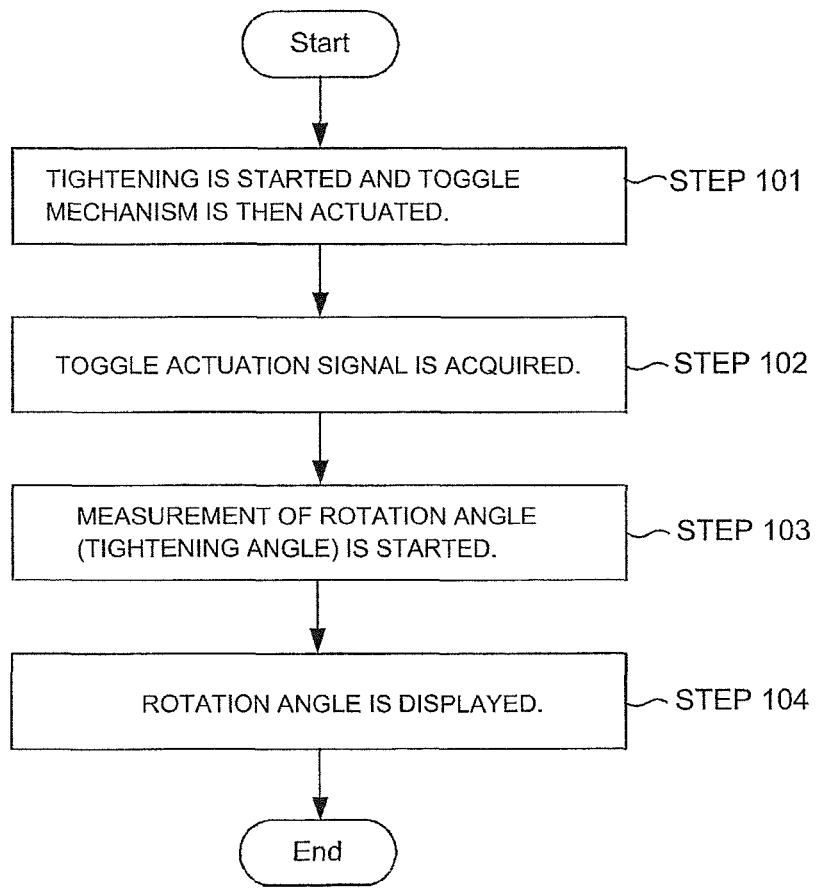
FIG. 5 is a flowchart showing the flow of a tightening angle measurement process by the rotation angle method using the device for measuring the rotation angle of the angle wrench.

A description will next be made to the flow of the tightening angle measurement by the angle wrench 1. FIG. 5 is a flowchart showing the flow of the tightening angle measurement by the angle wrench 1 using the rotation angle method.

First, the angle wrench 1 starts to tighten a screw, and then the toggle mechanism 6 is actuated when the tightening torque has reached the torque value set by the torque adjustment knob 12 (typically, the snug torque) (step 101).

Next, when the toggle mechanism 6 is actuated to relatively displace the interlock pin 18 and the interlock pin 18 pushes the microswitch 20, the microswitch 20 outputs a signal. The toggle actuation signal acquiring section 100 acquires the signal as the toggle actuation signal (step 102).

Next, when the toggle actuation signal acquiring section 100 has acquired the toggle actuation signal, the rotation angle computing section 102 computes the rotation angle of the angle wrench 1 from that point in time onward (step 103). The rotation angle computing section 102 computes the rotation angle, by which the angle tightening is performed by the angle wrench 1, on the basis of the data on the angular velocity measured by the gyro sensor 24 from the point in time onward at which the toggle mechanism 6 is actuated.

The output section 104 allows the rotation angle computed by the rotation angle computing section 102 to be displayed in real time on the display unit 16 (step 104). The user stops tightening when having confirmed, by taking a look at the rotation angle displayed on the display unit 16, that the rotation angle has reached a predetermined angle. This allows appropriate tightening in the rotation angle method in which the screw is tightened with a specified torque and then the screw is further tightened by a predetermined angle.

According to the angle wrench 1 of this embodiment described above, it is possible to accurately perform tightening in a simplified structure by the rotation angle method.

Note that this embodiment employs a gyro sensor as the angular velocity sensor; however, the invention is not limited thereto and any sensor can be employed so long as the sensor can determine the angular velocity. Furthermore, the rotation angle may also be determined using an angular acceleration sensor in place of the angular velocity sensor.

REFERENCE SIGNS LIST

1 angle wrench
2 handle
2*a* grip section
2*b* head pin
4 head section
4*a* tightening head
4*b* square drive
4*c* tail section
6 toggle mechanism
8 thruster
10 spring
12 torque adjustment knob
14 case
16 display unit
18 interlock pin
20 microswitch
22 control unit
24 gyro sensor
26 operation key
30 CPU
32 memory
102 rotation angle computing section

The invention claimed is:

1. An angle wrench for tightening an object to be tightened by a rotation angle method, comprising:
   a handle having a grip;
   a head section having a tightening head configured to tighten the object to be tightened and a tail section that extends from the tightening head and is pivotally supported with respect to the handle via a head pin;
   a case that is disposed on the handle, accommodates an electric circuit, and includes a display unit on an outer surface of the case, and is configured to display the tightening angle of the object being tightened;
   a torque-detecting mechanism configured to detect when a torque for tightening the object to be tightened has reached a specified torque, the torque-detecting mechanism having:
      a toggle mechanism configured to couple the tail section of the head section to the handle and to change from a first coupling state to a second coupling state when a tightening torque for the object being tightened has reached the specified torque,
      an interlock pin that extends from the head section into the case through holes formed respectively in the handle and the case, the interlock pin being displaced following actuation of the toggle mechanism, and
      a detection sensor configured to detect movement of the interlock pin due to the actuation of the toggle mechanism; and
   a rotation angle-measuring section that is accommodated inside the case and configured to measure a rotation angle of the angle wrench in a tightening action, on a basis of an angular velocity of the angle wrench around an axis of the object being tightened, after a timing at which the torque-detecting mechanism detects that the specified torque has been reached,
   wherein the rotation angle-measuring section measures the rotation angle of the angle wrench during the tightening action after a timing at which the detection sensor has detected the movement of the interlock pin.

2. The angle wrench according to claim 1, wherein the rotation angle-measuring section has a gyro sensor configured to measure the angular velocity of the tightening action on the object being tightened and a computing section configured to compute the rotation angle of the angle wrench on the basis of the angular velocity measured by the gyro sensor.

3. The angle wrench according to claim 1, wherein the interlock pin is fixed to the tail section of the head section and extends into the case so that when the toggle mechanism is not actuated, the interlock pin is contacting the detection sensor, and when the toggle mechanism is actuated, the tail section rotates around the head pin to displace the interlock pin causing the interlock pin to press against the detection sensor.

4. The angle wrench according to claim 3, wherein the toggle mechanism includes a thruster that is urged toward the tightening head and presses against the tail section of the head section, so that when the torque for tightening the object to be tightened is equal to or below the predetermined torque, the thruster restricts a rotation of the tail section in respect to the handle, and when the torque for tightening the object to be tightened exceeds the predetermined torque, the toggle mechanism is actuated and the tail section moves the thruster in a direction away from the tightening head to cause the tail section to rotate around the head pin and displace the interlock pin so that the interlock pin presses against the detection sensor.

5. A rotation angle measuring device configured to measure a tightening angle by a rotation angle method, the rotation angle measuring device being provided to a wrench in which a handle having a grip is coupled by a toggle mechanism to a head section configured such that a tail section extending from a tightening head configured to tighten an object to be tightened is pivotally supported via a head pin with respect to the handle and in which when a tightening torque for the object to be tightened has reached a specified torque, the toggle mechanism is actuated to change from a first coupling state to a second coupling state and an interlock pin extending from the head section is displaced following the actuation of the toggle mechanism, the rotation angle measuring device comprising:
   a case that is configured to attach to the handle to receive the interlock pin, accommodates an electric circuit, and includes a display unit disposed on an outer surface of the case configured to display the tightening angle of the object being tightened,
   a gyro sensor configured to measure an angular velocity during a tightening action;
   a sensor configured to detect movement of the interlock pin due to the actuation of the toggle mechanism; and
   a rotation angle computing section configured to compute a rotation angle of the wrench during the tightening action after a timing at which the sensor has detected the movement of the interlock pin on a basis of the angular velocity of the wrench around an axis of the object to be tightened, the angular velocity being measured by the gyro sensor.

\* \* \* \* \*